Sept. 15, 1931. H. A. THOMPSON 1,823,176

RAILWAY TRACK CIRCUIT APPARATUS

Filed July 31, 1931

Lock on Switch Lever.

INVENTOR:
H. A. Thompson,
BY
His ATTORNEY.

Patented Sept. 15, 1931

1,823,176

UNITED STATES PATENT OFFICE

HOWARD A. THOMPSON, OF EDGEWOOD, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRACK CIRCUIT APPARATUS

Application filed July 31, 1931. Serial No. 554,244.

My invention relates to railway track circuit apparatus, and particularly to the track circuits associated with two tracks which are connected by a crossover.

One feature of my invention is the provision of novel and improved means for preventing improper operation of such apparatus due to loss of shunt when the crossover is infrequently used, and a short vehicle, such as a locomotive or a gasoline electric car, passes thereover.

I will describe one form of apparatus embodying my invention, and will then point out the novel features thereof in claims.

Figure 1:
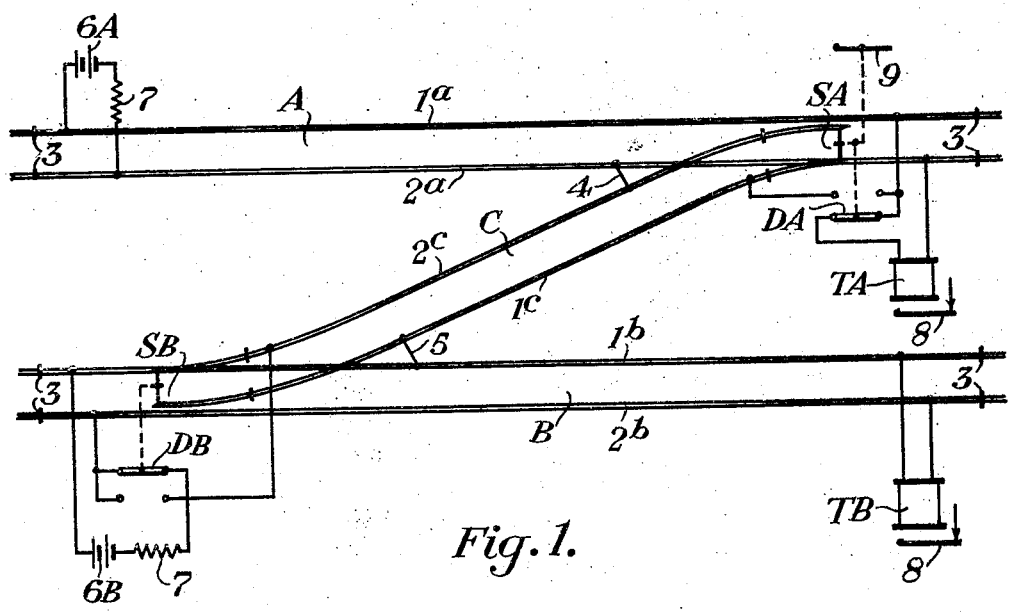
Figure 2:
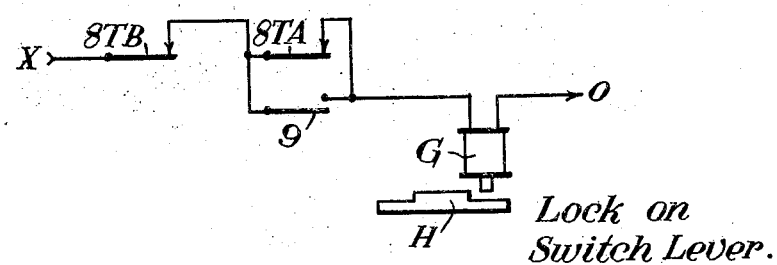

In the accompanying drawings, Fig. 1 is a diagrammatic view showing one form of track circuit apparatus embodying my invention. Fig. 2 is a diagrammatic view showing one means, also embodying my invention, for controlling the crossover switches by the track circuit apparatus shown in Fig. 1.

Similar reference characters refer to similar parts in each of the views.

Referring first to Fig. 1, the reference characters A and B designate two parallel tracks which are connected by a crossover C. Track A is divided by insulated joints 3 to form a track section, and this section is provided with a track circuit comprising a battery 6A connected across the rails at one end, and a track relay TA normally connected across the rails at the other end. Track B is similarly divided by insulated joints 3 to form a track section, and this section is provided with a track circuit comprising a track battery 6B normally connected across the rails at one end, and a track relay TB connected across the rails at the other end. The usual current-limiting resistance 7 is interposed between each track battery and one of the rails.

The switch SA of the crossover C operates a circuit controller DA and also a contact 9. The switch SB operates a similar circuit controller DB.

The rail 2ª of track A is constantly connected with rail 2ᶜ of crossover C by a conductor 4, and the rail 1ᵇ of track B is constantly connected with the rail 1ᶜ of crossover C by a conductor 5.

When switch SA is in normal position, circuit controller DA operates to connect track relay TA with the rail 1ª, but when switch SA is reversed, the circuit controller DA will disconnect relay TA from rail 1ª and will connect this trail with rail 1ᶜ of the crossover. When switch SB is in the normal position, circuit controller DB connects battery 6B with rail 2ᵇ, but when the switch is reversed, this circuit controller will disconnect battery 6B from rail 2ᵇ and will connect rail 2ᵇ with rail 2ᶜ of the crossover.

When the switches are normal, the track circuit for each track is independent of the other track and of the crossover, so that each track circuit functions in the usual manner. When the switches are reversed, however, track relay TA will be disconnected from rail 1ª, and battery 6B will be disconnected from rail 2ᵇ; battery 6A and track relay TB will then be included in a single track circuit which includes the rails of both tracks A and B and the rails of the crossover. This single track circuit is from the left-hand terminal of battery 6A, through track rail 1ª, circuit controller DA, rail 1ᶜ, conductor 5, rail 1ᵇ, track relay TB, rail 2ᵇ, circuit controller DB, rail 2ᶜ, conductor 4, rail 2ª, and resistance 7 to the right-hand terminal of battery 6A. Assuming now that, with the switches reversed, a vehicle moving toward the right enters the track section for track B, this vehicle will at once shunt track relay TB, and will keep this relay shunted as long as the vehicle occupies any part of crossover C or the insulated section of track A. Similarly, if a vehicle moving toward the left enters the insulated section of track A, it will immediately shunt relay TB, and will keep this relay shunted as long as the vehicle occupies crossover C or any part of the insulated section for track B. If the rails of crossover C are infrequently used, so that they are rusty or dirty, the contact between the rails and the wheels of the vehicle may be such that the track relay, if energized, would not become de-energized, but it is unlikely that the contact resistance would be so high as to permit the track relay, when previously de-energized, to become effectively energized.

Referring now to Fig. 2, the lever for the control of switches SA and SB is provided with a locking device H, which is controlled by a lock magnet G in such manner that the lever cannot be moved to operate the switches unless magnet G is energized. The switch lever and the mechanism for operating the switches by this lever, form no part of my invention, and, consequently, they are omitted from the drawings in order to simplify the disclosure. Magnet G is provided with a circuit which passes from terminal X of a suitable source of current, through front contact 8 of track relay TB, front contact 8 of track relay TA, and winding of relay G to terminal O of the same source of current. It follows that when the switches are in their normal positions they cannot be reversed unless both track relays TA and TB are energized. When the switches are reversed, however, contact 9 will be closed, and this contact is connected in the circuit for magnet G in multiple with contact 8 of track relay TA. It follows that when the switches are reversed, track relay TA is removed from control of the magnet G, so that it is only necessary for track relay TB to be energized in order to permit the switches to be restored to their normal positions.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, two parallel tracks connected by a crossover, a track circuit for each track including a source of current and track relay, and means operating when the switches of said crossover are reversed to disconnect the track relay from one track circuit and the source of current from the other and to connect the rails of said two tracks through the rails of the crossover so that the remaining source and the remaining relay are included in a single track circuit.

2. In combination, two parallel tracks A and B connected by a crossover C, means for constantly connecting rail $2^c$ of the crossover with rail $2^a$ of track A and rail $1^c$ of the crossover with rail $1^b$ of track B, a track circuit for each track including a source of current and a track relay, each normally connected across the rails, and means operating when the switches of said crossover are reversed to disconnect the track relay from a rail of track A and the source from a rail of track B, and to connect rail $1^a$ of track A with rail $1^c$ of the crossover and rail $2^b$ of track B with rail $2^c$ of the crossover, so that the remaining source and relay together with the rails of said tracks and crossover constitute a single track circuit.

3. In combination, two parallel tracks connected by a crossover, a track circuit for each track including a source of current and track relay, means operating when the switches of said crossover are reversed to disconnect the track relay from one track circuit and the source of current from the other and to connect the rails of said two tracks through the rails of the crossover so that the remaining source and the remaining relay are included in a single track circuit, means for controlling said switches by both of said relays when the switches are in normal position, and means operating when said switches are reversed to remove the disconnected relay from control of the switches.

4. In combination, two parallel tracks A and B connected by a crossover C, means for constantly connecting rail $2^c$ of the crossover with rail $2^a$ of track A and rail $1^c$ of the crossover with rail $1^b$ of track B, a track circuit for each track including a source of current and a track relay, each normally connected across the rails, means operating when the switches of said crossover are reversed to disconnect the track relay from a rail of track A and the source from a rail of track B, and to connect rail $1^a$ of track A with rail $1^c$ of the crossover and rail $2^b$ of track B with rail $2^c$ of the crossover, so that the remaining source and relay together with the rails of said tracks and crossover constitute a single track circuit, means operating when said switches are normal to control them by both of said relays, and means operating when said switches are reversed to remove the relay for track A from control of the switches.

In testimony whereof I affix my signature.

HOWARD A. THOMPSON